US010296962B2

(12) United States Patent
Abraham et al.

(10) Patent No.: US 10,296,962 B2
(45) Date of Patent: May 21, 2019

(54) COLLABORATIVE SHOPPING ACROSS MULTIPLE SHOPPING CHANNELS USING SHARED VIRTUAL SHOPPING CARTS

(75) Inventors: Subil M. Abraham, Plano, TX (US); Rajaraman Hariharan, Bangalore (IN); Ramakrishnan Kannan, Bangalore (IN); Mathews Thomas, Flower Mound, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 587 days.

(21) Appl. No.: 13/372,493

(22) Filed: Feb. 13, 2012

(65) Prior Publication Data
US 2013/0211953 A1    Aug. 15, 2013

(51) Int. Cl.
*G06Q 30/00*    (2012.01)
*G06Q 30/06*    (2012.01)

(52) U.S. Cl.
CPC ......... *G06Q 30/0633* (2013.01); *G06Q 30/06* (2013.01); *G06Q 30/0641* (2013.01)

(58) Field of Classification Search
CPC ........... G06Q 30/0633; G06Q 30/0641; G06Q 30/0601; G06Q 30/06
USPC ..... 705/26.1, 26.2, 26.25, 26.3, 26.35, 26.4, 705/26.41–26.44, 26.5, 26.61–26.64, 26.7, 705/26.8, 26.81, 26.82, 26.9, 27.1, 27.2, 705/14.51; 3/26.1, 26.2, 26.25, 26.3, 3/26.35, 26.4, 26.41–26.44, 26.5, 3/26.61–26.64, 26.7, 26.8, 26.81, 26.82, 3/26.9, 27.1, 27.2
See application file for complete search history.

(56) References Cited

U.S. PATENT DOCUMENTS

| 5,878,400 A | 3/1999 | Carter, III |
| 6,269,343 B1 | 7/2001 | Pallakoff |
| 6,850,899 B1 * | 2/2005 | Chow ............... G06Q 30/06 705/26.8 |
| 6,873,968 B2 * | 3/2005 | Ehrlich et al. .......... 705/80 |
| 6,876,977 B1 * | 4/2005 | Marks ............ 705/26.62 |
| 6,912,507 B1 * | 6/2005 | Phillips et al. ....... 705/7.13 |
| 6,925,444 B1 | 8/2005 | McCollom et al. |
| 7,356,490 B1 * | 4/2008 | Jacobi et al. ......... 705/26.8 |
| 7,364,070 B2 * | 4/2008 | Chang ................ 235/383 |

(Continued)

FOREIGN PATENT DOCUMENTS

| EP | 1170690 A1 * | 1/2002 | ........ G06F 17/60 |
| GB | 2458388 A | 9/2009 | |
| WO | 0127837 A2 | 4/2001 | |

OTHER PUBLICATIONS

IBM et al., "Collaborative Web Shopping Experience," Published Jan. 30, 2008 https://ip.com/IPCOM/000167113 (Year: 2008).*

(Continued)

*Primary Examiner* — Resha Desai
*Assistant Examiner* — Lance Y Cai
(74) *Attorney, Agent, or Firm* — Cuenot, Forsythe & Kim, LLC

(57) ABSTRACT

A system for collaborative shopping comprising shopping devices interconnected by a network and respectively used by shoppers in a collaborative shopping session, and virtual shopping carts respectively associated with the shopping devices for sharing information on items of interest among the shoppers and enabling the shoppers to collaborate on the shopping.

20 Claims, 8 Drawing Sheets

(56) References Cited

U.S. PATENT DOCUMENTS

| | | | |
|---|---|---|---|
| 7,480,627 B1 | 1/2009 | Van Horn et al. | |
| 7,593,871 B1 | 9/2009 | Mesaros | |
| 7,620,404 B2* | 11/2009 | Chesnais et al. | 455/456.1 |
| 7,647,247 B2* | 1/2010 | Abraham et al. | 705/26.2 |
| 7,648,068 B2* | 1/2010 | Silverbrook et al. | 235/383 |
| 7,840,447 B2 | 11/2010 | Kleinrock et al. | |
| 7,970,661 B1 | 6/2011 | Abraham et al. | |
| 8,418,919 B1* | 4/2013 | Beyda | 235/383 |
| 2002/0113123 A1* | 8/2002 | Otto et al. | 235/381 |
| 2002/0170961 A1* | 11/2002 | Dickson | G06K 7/0008 |
| | | | 235/383 |
| 2003/0126040 A1 | 7/2003 | Mesaros | |
| 2005/0022119 A1 | 1/2005 | Kraemer | |
| 2005/0033656 A1* | 2/2005 | Wang et al. | 705/26 |
| 2005/0096997 A1 | 5/2005 | Jain et al. | |
| 2005/0177446 A1 | 8/2005 | Hoblit | |
| 2006/0122895 A1 | 6/2006 | Abraham et al. | |
| 2007/0078727 A1 | 4/2007 | Spiegel et al. | |
| 2007/0179867 A1 | 8/2007 | Glazer et al. | |
| 2007/0235527 A1* | 10/2007 | Appleyard | G06Q 10/087 |
| | | | 235/383 |
| 2007/0239552 A1 | 10/2007 | Sundaresan | |
| 2008/0040240 A1* | 2/2008 | Covington et al. | 705/27 |
| 2008/0046331 A1* | 2/2008 | Rand | 705/26 |
| 2009/0043670 A1 | 2/2009 | Johansson et al. | |
| 2009/0043674 A1 | 2/2009 | Minsky et al. | |
| 2009/0106085 A1 | 4/2009 | Raimbeault | |
| 2009/0172565 A1 | 7/2009 | Jackson et al. | |
| 2009/0265255 A1 | 10/2009 | Jackson et al. | |
| 2010/0030578 A1 | 2/2010 | Siddique et al. | |
| 2010/0030662 A1* | 2/2010 | Klein | 705/27 |
| 2010/0223147 A1* | 9/2010 | Oishi | 705/23 |
| 2011/0016023 A1 | 1/2011 | Zakas | |
| 2011/0178889 A1 | 7/2011 | Abraham et al. | |
| 2012/0185355 A1* | 7/2012 | Kilroy | G06Q 30/0633 |
| | | | 705/26.8 |
| 2013/0210461 A1* | 8/2013 | Moldaysky et al. | 455/456.3 |

OTHER PUBLICATIONS

Puglia, S. et al., "MuItECommerce: A distributed Architecture for Collaborative Shopping on the WWW", EC'00, Proc of the 2nd ACM Conf. on Electronic Commerce, pp. 215-224, Oct. 17, 2000.

U.S. Appl. No. 12/690,553, Notice of Allowance, dated Feb. 24, 2011, 5 pg.

* cited by examiner

COLLABORATIVE SHOPPING ACROSS MULTIPLE SHOPPING CHANNELS USING SHARED VIRTUAL SHOPPING CARTS

BACKGROUND

The invention relates generally to computer-based shopping, and more particularly, to systems and methods for collaborative shopping across multiple shopping channels using shared virtual shopping carts.

Shopping on the Web and in physical stores are two common shopping modes. However, it is generally not practical for customers using these shopping channels to collaborate on their shopping, particularly at the same time when they shop. A customer who begins shopping on the Web typically stays on the Web to complete a purchase online. The same is true for a customer who enters a physical store to shop as such a customer generally does not interact with other shopper who may be shopping online at the same time and have similar shopping needs. The main reason for this practice is the lack of synchronization and the inability to have a single view of the shopping basket seen by the online shopper and the physical shopping cart used by the shopper in the store. Shopping is currently expanding to other channels such as those using telephones, mobile Web devices, and so on. However, these channels mostly operate independently from each other and do not readily support collaborative shopping.

Collaborative shopping by shoppers who use different shopping channels would provide several benefits such as the sharing of shopping information, combining individual purchases into joint transactions, quickly locating the best items at the best prices, and determining the best methods for receiving the items.

BRIEF SUMMARY

The invention relates to computer-implemented methods, systems, and computer program products for collaborative shopping by shoppers across different shopping channels using shared virtual shopping carts. The shoppers use interconnected devices to share shopping information and collaborate on finding desired items, selecting items to purchase, and handling other tasks such as paying for the purchased items at checkout and shipping of the items.

In one exemplary embodiment of the invention, a system for collaborative shopping comprises a plurality of virtual shopping carts associated with shopping devices used by shoppers in a collaborative shopping session, wherein the devices are connected by a network. The virtual shopping carts share information on items of interest to the shoppers based on shopper preferences and enable the shoppers to collaborate on shopping decisions.

In a second exemplary embodiment of the invention, a computer-implemented method for collaborative shopping comprises establishing virtual shopping carts associated with shopping devices used by shoppers in a collaborative shopping session wherein the devices are connected by a network, sharing information on items of interest among the shoppers based on shopper preferences, and collaborating by the shoppers on shopping decisions through the virtual shopping carts.

In a third exemplary embodiment of the invention, a computer program product comprises a computer readable storage medium having computer readable program code embodied therewith. The computer readable program code comprises computer readable program code configured to establish a plurality of virtual shopping carts associated with shopping devices used by shoppers in a collaborative shopping session, wherein the shopping devices are connected by a network. The virtual shopping carts share information on items of interest to the shoppers based on shopper preferences and enable the shoppers to collaborate on shopping decisions.

The details of the preferred embodiments of the invention, both as to its structure and operation, are described below in the Detailed Description section in reference to the accompanying drawings, in which like reference numerals refer to like parts. The Brief Summary is intended to identify key features of the claimed subject matter, but it is not intended to be used to limit the scope of the claimed subject matter.

DETAILED DESCRIPTION

Figure 1:
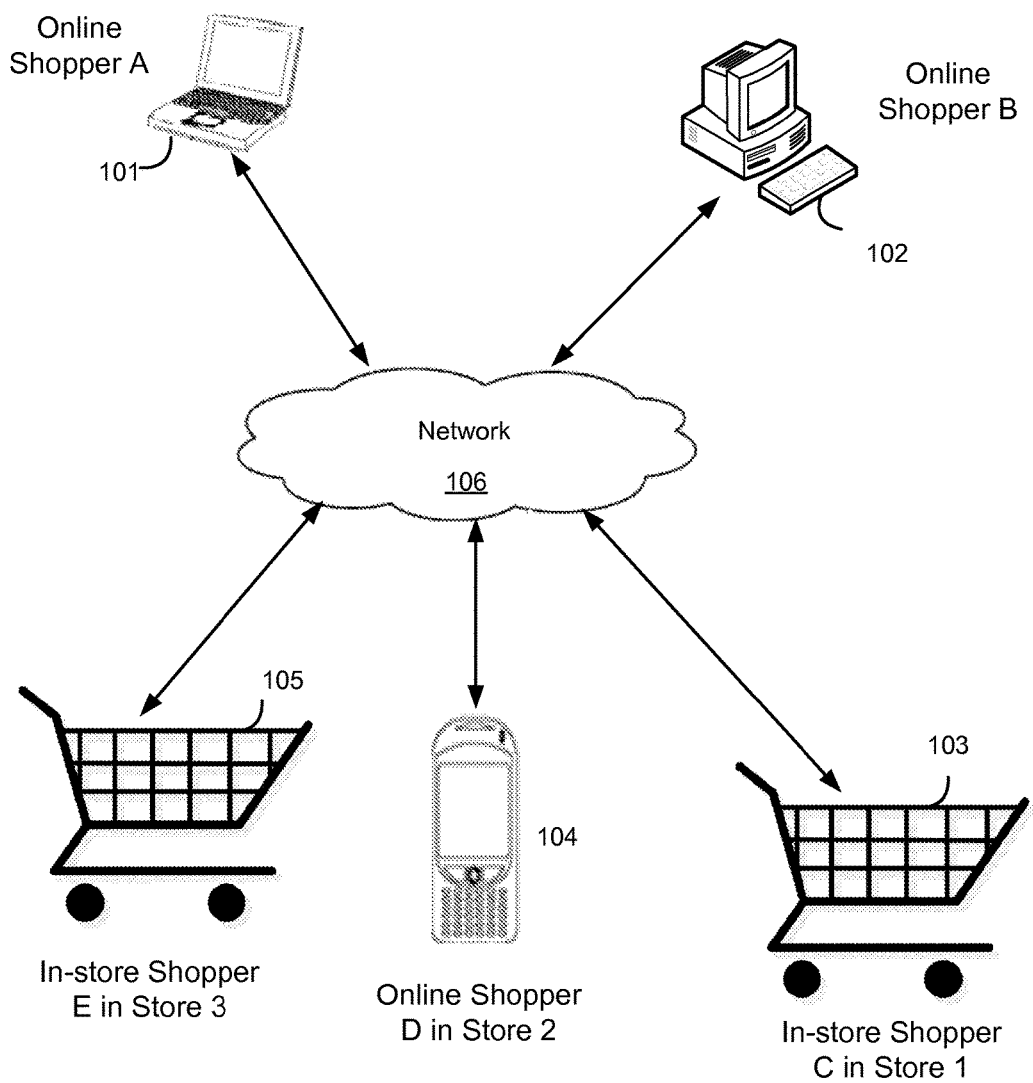
FIG. 1 is a block diagram illustrating multiple shoppers who may use different shopping channels to collaborate on their shopping for desired items, according to an embodiment of the invention.

The invention relates generally to collaborative shopping. More particularly, the invention is directed to systems, methods, and computer program products for collaborative shopping in which shoppers using different shopping channels share information and collaborate on identifying, selecting, and purchasing of items in a collaborative shopping session. The shoppers may use various shopping devices, interfaces, and shopping channels that are interconnected by computer networks.

Current shopping venues, such as physically shopping in stores and online shopping on the Web, are generally independent from each other. There is currently very limited interaction among the shoppers using different shopping venues such as online shopping and in-store shopping. A shopper in a physical store (in-store shopper) may occasionally call another person using a mobile telephone to inquire about the price of a particular item or whether the item is available at another store or on the Web. However, such an interaction is generally limited in scope and of little value to the shoppers. In addition, this interaction does not benefit other shoppers who may at the same time have similar shopping needs. Today's shoppers who use different shopping channels cannot easily collaborate on shopping decisions and share information such as promotions, shopping alerts, recommendations, etc.

As business enterprises are increasingly interconnected by computers, communication devices and networks, online shoppers may desire to establish collaborative shopping sessions with other shoppers who are currently in stores in order to jointly find the best available items, either in store or online, and to purchase these items at the best prices possible. Such a collaborative shopping environment allows shoppers in different shopping channels to share shopping information among cross-channel shopping carts which may include online shopping carts and personal shopping assistants (PSAs) fitted on the in-store physical shopping carts. For example, a shopper A at a retail store can establish a joint collaborative shopping session with a shopper B at another retail store using PSAs fitted on their physical shopping carts. The PSAs can compare prices of the products in the shopping carts and notify both shoppers A and B which retailer is offering a better price for a particular product.

In another shopping scenario, a shopper may want to spend time in the evening at home to find items offered at a local grocery store using the store's web site, and then spend minimal time the next day in the grocery store to pick up and pay for the items. Such a scenario would be possible if there was a quick mechanism to synchronize the online shopping cart with the in-store shopping cart. However, existing technology does not efficiently support such cross-channel collaboration and synchronization. For example, an online shopper may create a wish list of the items listed on the store's web site and download the wish list to a PSA device for in-store shopping. However, the synchronization of information across different shopping channels is usually only one way because the wish list is not updated to reflect purchases made in the store. Another option for cross-channel shoppers is to purchase items online and pick up the items at the stores. Many shoppers do not use this option because they generally prefer to see items before purchasing the items.

Embodiments of the invention provide efficient systems and methods for shoppers to share information and collaborate on shopping tasks across different shopping channels, such as finding and purchasing desired items, and sharing in-store experience with online shoppers. The embodiments may synchronize the shopping lists of multiple shoppers and enable the shoppers to collaborate on selecting the best items from available shopping channels, determining the best prices, and selecting payment and shipment methods at checkout. The embodiments may periodically synchronize the shopping carts of the shoppers to provide updated data to all shoppers participating in a collaborative shopping session. Shopping data may be maintained in a centralized storage area or distributed among the shopping devices participating the collaborative shopping session.

A shopper may create a shopping list on the Web and download the list using a personal shopping assistant (PSA) in a physical store. Alternately, the shopper may scan a physical product and add it to a virtual shopping cart for future purchase, instead of purchasing the item during the current shopping visit. Similarly a product added through a telephone based voice catalog may be added to a virtual shopping cart and later purchased on a Web based e-commerce site.

A virtual shopping cart may span multiple channels and include items that are being purchased by shoppers in the stores as well as online shoppers who purchase items from e-commerce websites. The items to be delivered may be for different shoppers in different locations, for store pickups and for home deliveries. Payments for the purchased items may include physical payment options like cash, credit cards, mobile phone based payment, and Web and Internet based payments. The shopping carts may be shared among the shoppers using different shopping channels, including but not limited to Web, mobile telephones, and physical stores.

Referring now to FIG. 1, there is illustrated a diagram of multiple shoppers who may use different shopping channels and collaborate in a shopping session, according to an embodiment of the invention. Shoppers A and B may be online shoppers who respectively use computers 101-102 to connect to the web and access online vendors to shop on the vendors' web sites. Shopper D may be traveling away from home and using a mobile telephone 104 with web capability to access a vendor's web site through the Internet while shopping in store 2. Shoppers C and E may be in two different physical stores 1 and 3 and respectively use physical shopping carts 103, 105 with personal shopping assistant (PSA) devices attached to the shopping carts 103, 105. The PSA devices may be connected to the Internet by wireless communications networks such as Wi-Fi networks. An example of the PSA devices is the IBM Personal Shopping Assistant™ offered by IBM Corporation. Network 106 may comprise one or more connected public and private networks, including the Internet and telephone networks.

Figure 2:
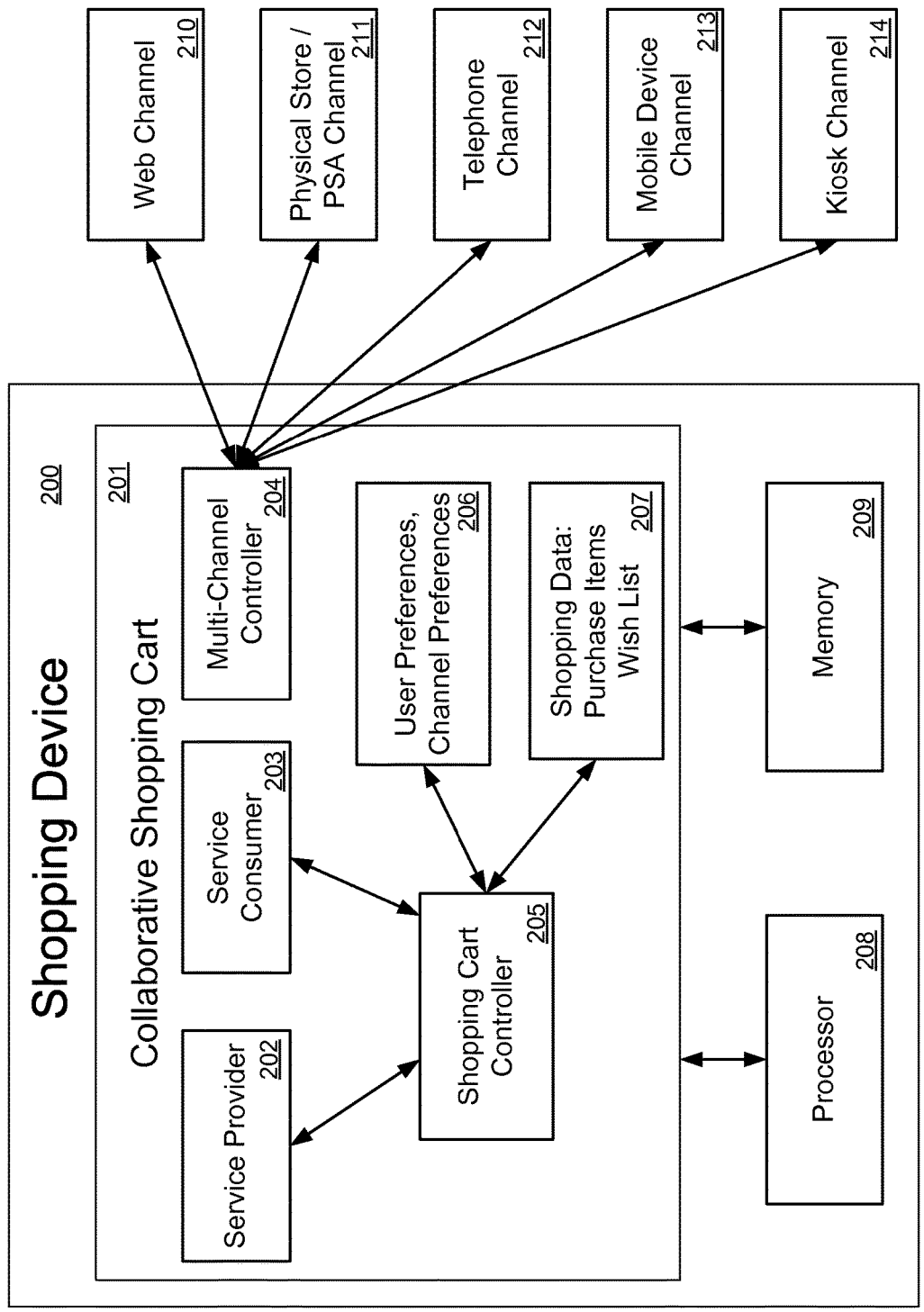
FIG. 2 is a block diagram illustrating an exemplary embodiment of a collaborative shopping cart for providing aspects of the invention.

FIG. 2 is a block diagram illustrating a collaborative shopping cart that may be established for a shopper in a collaborative shopping session, according an exemplary embodiment of the invention. The collaborative shopping cart 201 may be provided by a shopping device 200 which may be a computer, a personal digital assistant (PDA) device, a mobile telephone, or a portable shopping assistant (PSA) that is attached to a physical shopping cart used in a retail store. The shopping device 200 may comprise a processor 208 for controlling the operation and processing data in the shopping device 200, and a memory 209 for storing data. The shopping device 200 may further include appropriate network hardware and software components for connecting to a network 106. During a collaborative shopping session, the shopping device 200 may establish the collaborative shopping cart 201 to facilitate the exchange of shopping information with other shopping carts associated with other shoppers in the collaborative shopping session and allow the shoppers to collaborate on making shopping decisions, as described with reference to FIGS. 3-7.

The collaborative shopping cart 201 may comprise a service provider 202 to enable shoppers in the collaborative shopping session to request information about this particular collaborative shopping cart 201. In one embodiment, the service provider 202 may provide a Web service that can be accessed by other shoppers in the collaborative shopping session to request information about the shopping cart 201, such as the items currently in the cart.

The collaborative shopping cart 201 may include a service consumer 203 to allow the collaborative shopping cart 201 to request for information from the services provided by another instance of the shopping cart 201, retailers and Internet sources such as social network sites that may influence the shoppers in their selection of specific channels, retailers, and brands while shopping. The service provider 202 of a second collaborative shopping cart 201 that receives the request may provide the requested services information. Otherwise, the request for services information may go to another collaborative shopping cart 201 in the collaborative shopping session that may provide the information. For example, the service consumer 203 of a shopping cart 201 may invoke a Web service provided by an internet source to obtain information on a product item that the shopper just added to the shopping cart 201.

A multi-channel controller 204 provides interfaces between the collaborative shopping cart 201 with other shopping channels to allow shoppers from the other shopping channels and the collaborative shopping carts to communicate and exchange information with the collaborative shopping cart 201. The shopping channels may include, for example, an online web interface 210, a personal shopping assistant (PSA) 211 that is attached to an in-store physical shopping cart and connected to the Internet, a mobile telephone 212, a mobile device 213 such as a personal assistance device (PAD), and a shopping kiosk 214. For example, the multi-channel controller 204 may allow an online shopper who is using the shopping cart 201 to share promotion information with other shoppers in a collaborating shopping session who may currently be in physical retail stores.

In one embodiment, the multi-channel controller 204 may handle differences in the contents delivered to different shopping channels and thereby enable the shopping cart 201 to be independent of the shopping channels used in the collaborative shopping session. The multi-channel controller 204 may transform content delivered in one application environment to another environment using transcoding technology. Transcoding is a transformation of information from one form to another to bridge the gaps between the variety of data formats encountered on the Web and user devices. Transcoding may use specialized programs called transcoding plug-ins to perform different conversions, such as from HTML for a browser to WML for a Web-enabled cell phone. This makes Web-based information available to users of hand-held and other pervasive devices economically and efficiently. Transcoding may modify content presented to users based on the information associated with the request, such as device constraints and organizational policies.

The collaborative shopping cart 201 may include a shopping cart controller 205 to control access to the service provider 202 based on preferences established by the shopper using the collaborative shopping cart 201. The service provider 202 includes functions (i.e., services) for obtaining information from other shopping carts. For example, a function "startSession(collaboratingSessionID)" may enable a shopper to join a multi-channel collaborative shopping session. A function "syncItems(collaboratingSessionID)" may enable a shopper A to synchronize the items in the shopper A's shopping cart with other shopping carts in a collaborative shopping session. A function "endSession(collaborationSession)" may terminate a collaborative shopping session. A function "getPreferences (collaboration SessionID)" may obtain a shopper's personal preferences.

The shopping cart controller 205 may use the service consumer 203 to access services provided by the collaborative shopping carts 201 established for an ongoing collaborative shopping session. These services may include, for example, inquiring on the items currently in one of the collaborative shopping carts 201 in the collaboration session or on the price of an item offered by a retailer. In one embodiment, these services may be accomplished through Web service calls which enable a collaborative shopping cart 201 to get information from the services offered by other shopping carts 201 in the collaboration session, retailers, and Internet sources such as social networking, shopping, and consumer review Web sites.

The shopping cart controller 205 is also responsible for deciding what services need to be invoked and when the services are invoked. The types of services that are invoked depend on the design of a particular application. For example, the shopping cart controller 205 may use the service provider 202 to invoke a function "getprice(collaborationSessionID, retailerIDs)" to get the price of an item from five different retailers. The shopping cart controller 205 may control how the data from the services are collated and presented to a shopper depending on the invoked services. The presented data may include a listing of collaborators, sale promotions, etc. For example, information about the price of a product may be obtained from five different retailers and consumer feedback on the product may be obtained from two different web sites. The information presented to the shopper may include all of the collected details or only a summary of the details. The shopping cart controller 205 may further allow a shopper's user interface to make updates to the shopper preferences and item purchase data 208. This could be a simple interface since the shopping cart controller 205 controls the interface as well as the shopping preference list and item purchase data.

The capabilities of shopping cart controller 205 may depend on preferences 209 that a shopper has provided to configure the shopping cart controller 205. For example, a shopper's preferences may include buying electronic items using online channels, obtaining the shopper's permission before sharing the shopper's past purchase information with other collaborators, and getting price comparison information from retailers X and Y, but not from retailer Z.

The shopping cart controller 205 may in turn configure the functions provided by the collaborative shopping cart 201, based on the shopper's preferences. For example, due to the shopper preferences established above, price comparison will be obtained only from retailers X and Y, but not retailer Z. When a request for past purchases of a first shopper is requested by a second shopper, the request may be declined if the preference is set to obtain the first shopper's permission and the first shopper does not give such a permission.

The shopping cart controller 205 may optionally turn off certain components in the collaborative shopping cart 201. For example, if a shopper does not want to share the shopper's data, the shopping cart controller 205 may turn off the function for sharing shopping data as provided by the service provider component 202. The service provider 202 and service consumer 203 may check shopper preferences 206 before performing their functions. This creates the effect of changing or completely turning off selected functions of the collaborative shopping cart 201.

Shopping data 207 is equivalent to contents in a traditional shopping cart. The shopping data 207 may include items that a shopper adds to the collaborative shopping cart 201. The shopping data 207 may further include information that tracks and logs changes in the collaborative shopping session, information that identifies the shoppers participating in the collaborative shopping session, and other types of shopping information such as promotion alerts. The shopping data 207 also includes activities performed by the shopper in a specific channel. For example, a shopper in a store may walk by areas in the store in a particular sequence and an online web shopper in the collaborative shopping session is interested in the electronics section. Shopping data 207 may be stored in a memory or a storage medium of the computer or device supporting the collaborative shopping services.

Figure 3:
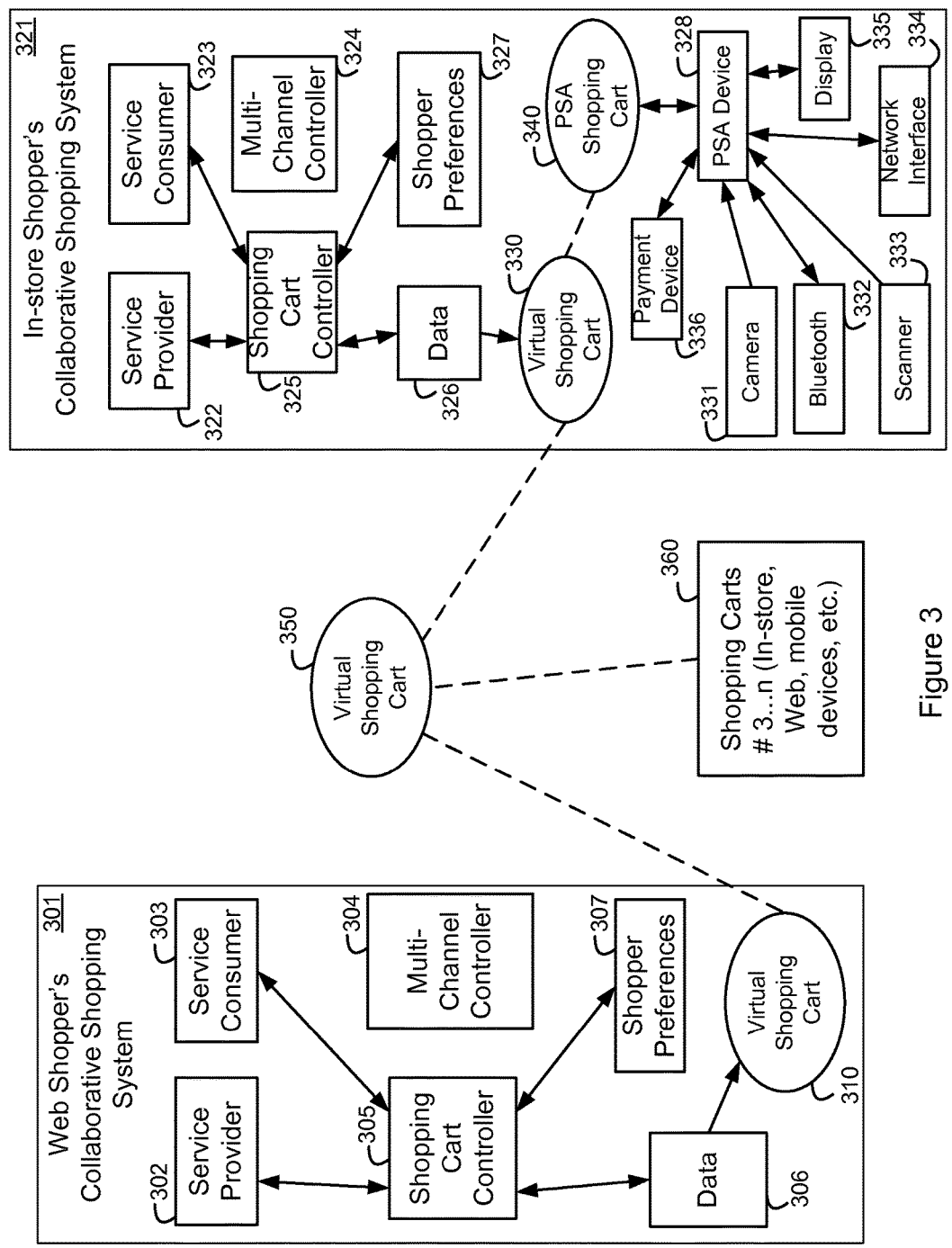
FIG. 3 is a block diagram illustrating multiple shopping carts associated with of the shoppers who use different shopping channels in a collaborative shopping session, according to an exemplary embodiment of the invention.

FIG. 3 is a block diagram illustrating collaborative shopping systems associated with the collaborating shoppers who use different shopping channels for shopping, according to an exemplary embodiment of the invention. Collaborative shopping system 301 may be initiated by a shopper who is shopping online through the Web. Collaborative shopping system 321 may be associated with a PSA device attached to a physical shopping cart being used by a shopper who is shopping in a physical retail store. Collaborative shopping systems 360 may be set up by other shoppers who may be shopping in other retail stores, shopping online on the web, or using mobile devices such as telephones. The collaborative shopping system 301 may comprise a service provider component 302, a service consumer component 303, and a multi-channel controller 304 as described with reference to FIG. 2. Shopping data generated and accessed by the collaborative shopping system 301 as well as shopping data shared among the collaborating shoppers may be stored in data area 306.

Preferences of the shopper associated with the collaborative shopping system 301 and of other shoppers in the collaborative shopping session may be stored in shopper preferences area 307. The collaborative shopping system 301 may present items on a shopping list, a wish list, and information that the shopper who is using the collaborative shopping system 301 wants to share with other shoppers in the collaborative shopping session. The collaborative shopping system 301 may comprise a virtual shopping cart 310 for holding the items of interest to the shoppers in the collaborative shopping session. The contents in the virtual shopping cart 310 are generally the same for all virtual shopping carts associated with the shoppers in the collaborative shopping session such as virtual shopping cart 330 and 360 set up by other collaborative shopping systems. These virtual shopping carts may be conceptually represented as a joint virtual shopping cart 350.

The collaborative shopping system 321 associated with a shopper in a physical store may comprise components 322-327 similar to components 302-307 of the collaborative shopping system 301 associated with the online shopper. The collaborative shopping system 321 may comprise a personal shopping assistant (PSA) device 328 attached to a physical shopping cart used by the shopper. The PSA device 328 may be coupled to a network interface component 334 and a Wi-Fi wireless communications interface, such as a Blue-tooth interface 332, for sending and receiving data between the PSA device 328 and a server connected to the Internet or the store's computer network. The PSA device 328 may maintain a PSA shopping cart 340 which is periodically synchronized with the contents of virtual shopping carts in the collaborative shopping session, e.g., virtual shopping carts 310, 330, 350, and 360. The PSA device 328 thus maintains two views of its shopping cart, one view seen by collaborating shoppers through the virtual shopping cart 330 and another view 340 representing the items in the physical shopping cart as reported by the PSA device and its peripheral devices 331-335.

The PSA device 328 may be coupled to a camera 331 to capture images or videos of the items considered, selected or purchased during the shopping, and items currently in the physical shopping cart. The camera 331 is one example of the interface devices that may be used with physical shopping carts to enable collaboration among the shoppers. Other possible mechanisms for sharing information in a collaborative shopping session may include microphones for communicating sound and similar input/output interface devices to aid the remote shoppers who are part of the collaborative session. The PSA device 328 may be connected to a scanner 333 to allow scanned images of the items being considered for purchase, information on their packages, and item documents to be shared among the shoppers in the collaborative shopping session. A display 335 connected to the PSA device 328 may display contents in the PSA shopping cart 340 and other shopping information to the in-store shopper.

The PSA device 328 may also be connected to a payment device 336, such as a card-strip reader, which may also be connected to a point-of-sale controller unit in the store to process shopper payments. Periodically, the PSA shopping cart 340 may be synchronized with the virtual shopping cart 330 maintained by the PSA device 328 and other virtual shopping carts 310 and 350 accessed by the shoppers in the collaborative shopping session. The shoppers who access the virtual shopping carts 310 and 350 may be using different shopping channels such as online Web shopping through computers, mobile telephones, shopping assistant devices, and shopping in physical stores.

Figure 4:
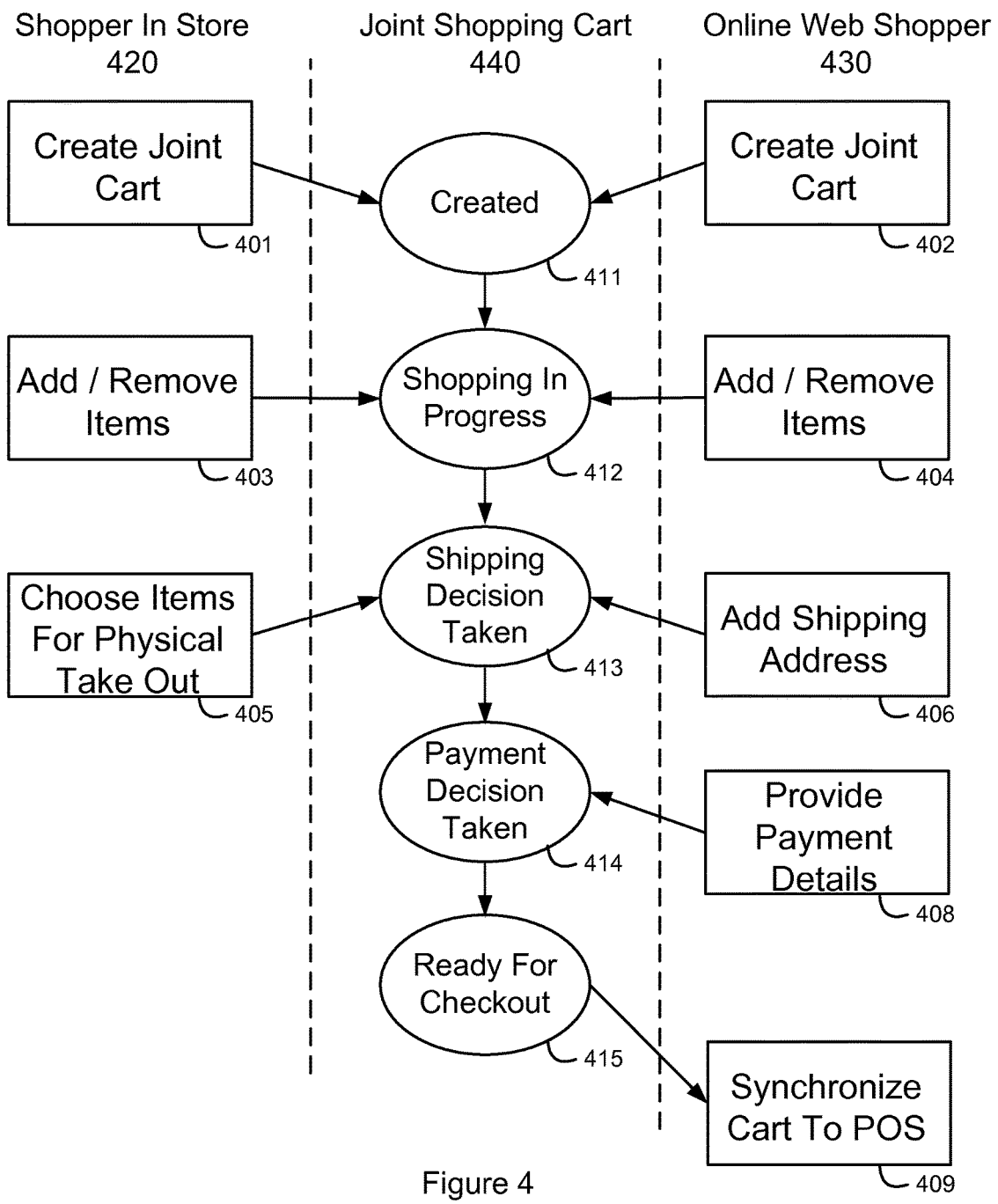
FIG. 4 is a block diagram showing exemplary operations during a collaborative shopping session by multiple shoppers, according to an embodiment of the invention.

FIG. 4 is a block diagram that shows exemplary operations performed during a collaborative shopping session by multiple shoppers, according to an embodiment of the invention. As an example, FIG. 4 illustrates a shopper 420 in a physical store and an online web shopper 430 with their respective actions in the left and right columns. The collaborative shopping session maintains a joint shopping cart 440 through which the in-store shopper 420 and the web shopper 430 share shopping information and collaborate on their shopping. The joint shopping cart 440 represents the virtual shopping carts 310, 330, 340, 350 and 360 associated with the shoppers in a collaborative shopping session. The states of the joint shopping cart 440 are shown in the middle column of FIG. 4.

Initially, the in-store shopper 420 and web shopper 430 may join a collaboration shopping session, which in turn creates the joint shopping cart 440, per blocks 401-402. The collaboration request may come from the in-store shopper 420 or the online shopper 430 using any available shopping channel that supports collaborative shopping across different shopping channels. The collaboration may also be initiated by a service operating in a shopping device that detects a condition suitable for the collaboration, thereby alerting other shoppers on the participating shopping channels with a recommendation to collaborate. In one embodiment, it is possible that a new shopping collaborator may join or leave the collaborative shopping session at any time. Once the collaboration is successfully established, the collaborative shopping cart is in the "created" state (411).

For each item in the joint shopping cart 440 or in a retailer catalog, the joint shopping cart 440 may permit the shoppers 420-430 to collaborate and share information about another item that is relevant to the item in the joint shopping cart 440 or the retailer catalog. The relevant item may be an item that is available online or in a physical store. The joint shopping cart 440 also allows various types of information to be shared among the collaborating shoppers 420-430 such as a shopper's experience about a product, consumer product reviews from the Internet, free style text messages from users, etc. Such information may, for example, allow the collaborating shoppers to jointly make a decision on whether to purchase an item.

In an embodiment of the invention, if all collaborating shoppers decide to purchase an item, the item may be added to the joint shopping cart 440. Similarly, if the collaborating shoppers decide not to purchase an item, the item may be removed from the joint shopping cart 440. The addition and removal of items to or from the joint shopping cart are indicated by blocks 403-404. The joint shopping cart 440 may be in a "shopping in progress" state 412 while the in-store and online shoppers 420-430 are sharing information and deciding on the items to be added to or removed from the shopping cart 440.

For the items in the joint shopping cart 440 that are marked to be physically taken out by the in-store shopper 420, the in-store shopper 420 may manually scan the items with a PSA device and then add the items to the in-store shopper 420's physical shopping cart. On the other hand, when an item that has previously been placed in the physical shopping cart is removed from the joint shopping cart 440, such an item may not need to be removed from the physical shopping cart. Although this would create a difference between a virtual shopping cart maintained by the PSA device and the joint shopping cart 440, the in-store shopper 420 may be alerted of the difference at a point-of-sale (POS) checkout to allow the in-store shopper 420 to make a final decision on the item. At that point, the in-store shopper 420 may decide whether to purchase the item that is in the physical shopping cart but not in the joint shopping cart 440.

At any time during the collaborative shopping, the shoppers 420-430 may check the joint shopping cart 440 for a particular item that is on their shopping lists or has been considered, or check the status of the item. A collaborating shopper 420-430 may provide additional information about an item to be shared among the collaborating shoppers such as the reason why the item was deselected from the shopping cart 440. The joint shopping cart 440 also tracks and logs shopper actions related to the addition and removal of items from the joint shopping cart 440 and information relevant to these actions.

Once the collaborating shoppers 420-430 have selected the items that they want to purchase, they may decide on how to take delivery of the items, including the in-store shopper 420 physically picking up the items from the store (405), having certain items shipped to an address (406), having certain items shipped to a specific store location, etc. After the collaborating shoppers 420-430 have decided on the delivery of the purchased items, the joint shopping cart 440 may be in a "shipping decision taken" state 413.

The collaborating shoppers 420-430 may jointly decide on payment details, such as details 408, using one of more methods of payment. The payment methods may include a physical store tender such as cash, credit card, gift cart, etc., and online payments. The joint shopping cart 440 may enter a "payment decision taken" state 414 once the shoppers 420-430 provide the payment details. At the "ready for checkout" state 415, the joint shopping cart 440 may be synchronized with a point-of-sale terminal. During synchronization, the information from the joint shopping cart 440 may be sent to a point-of-sale controller unit or terminal, per block 409. This synchronization may be done, for example, using a Web service call.

Figure 5:
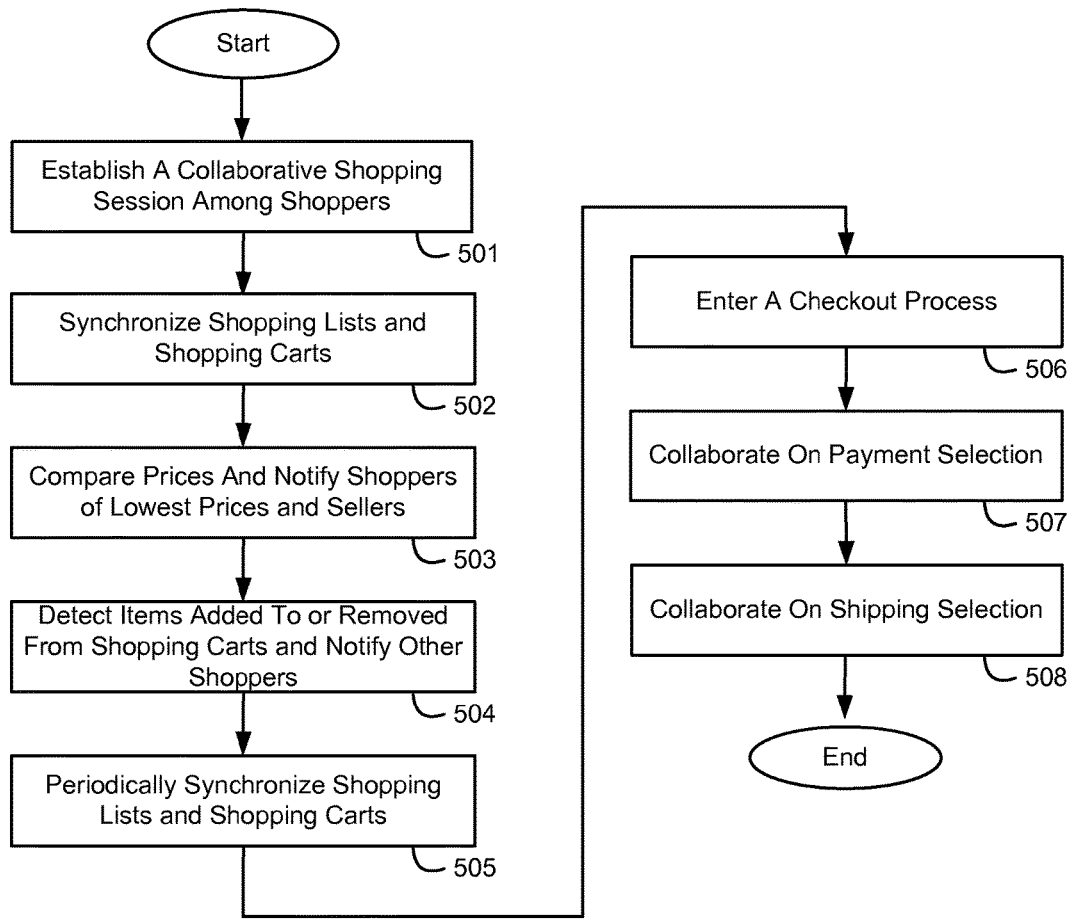
FIG. 5 is a flowchart illustrating an exemplary process in which shoppers may share shopping lists, wish lists, and price lists, and collaboratively select items to purchase, payment methods, and shipping methods, according to an embodiment of the invention.

FIG. 5 is a flowchart illustrating in more detail the steps through which collaborating shoppers may share shopping lists, prices, and collaboratively select items for purchase, payment methods, and shipping methods, according to an embodiment of the invention. One of the shoppers may initiate a collaborative shopping session using a computer, telephone or a PSA device, at block 501. Through an invitation or alert that other shoppers may receive through their shopping channels, the other shoppers may join the collaborative shopping session that has been initiated. The shopping devices used by the collaborating shoppers may establish virtual shopping carts for the shoppers, and synchronize the shoppers' shopping lists and contents of the shoppers' virtual shopping carts, at step 502. While considering items to add to the shopping carts, the collaborating shoppers may compare prices and notify each other of the lowest prices for the items and their sellers through the communication interfaces coupled to the virtual shopping carts, at block 503.

A virtual shopping cart may detect items that were added to or removed from a virtual shopping cart and notify the shoppers using other virtual shopping carts in the collaboration of these changes, at block 504. During the collaborative shopping session when items may be added to or removed from different virtual shopping carts, the process may periodically synchronize the shopping lists of the shoppers and the contents of the virtual shopping carts so that all shoppers are viewing the same and most updated data. Once the selection of the items is complete, the process may enter a checkout step 506 in which the shoppers may collaboratively decide on how to pay for the items (507) and whether to pick up the items from a store or have the items shipped to an address (508).

Figure 6:
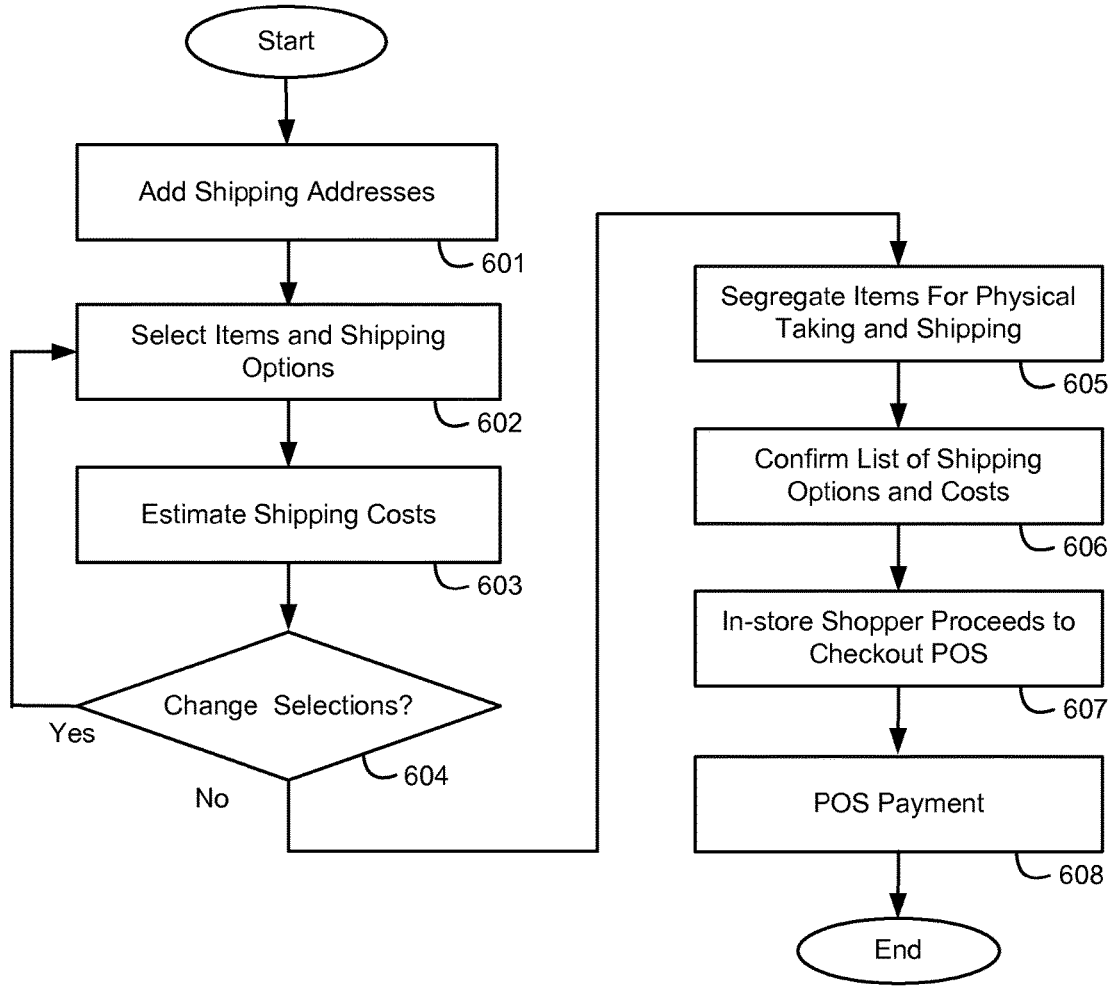
FIG. 6 is a flowchart illustrating an exemplary process in which shoppers may collaborate on specifying details about the shipment of the purchased items, according to an embodiment of the invention.

FIG. 6 is a flowchart illustrating an exemplary process in which shoppers may collaborate on deciding a shipping method, according to an embodiment of the invention. At step 601, one of the shoppers in the collaborating shopping session may provide a shipping address where certain items that the shoppers purchase may be shipped to. The shoppers may select the items to be shipped and shipping options such as a method of shipping, at step 602, and estimate shipping costs at step 603. A collaborating shopper may go back to change the items to be shipped or shipping options as indicated by steps 604 and 602. At step 605, the process may segregate the items in the shopping cart that will be physically taken from the store from those that will be shipped. Once the list of items to be shipped and their shipping costs are confirmed at step 606, the in-store shopper 420 may proceed to a checkout terminal at step 607. For the items that the collaborative shoppers have decided to pay at the store, the in-store shopper 420 may pay for these items at a point-of-sale terminal, at step 608.

Figure 7:
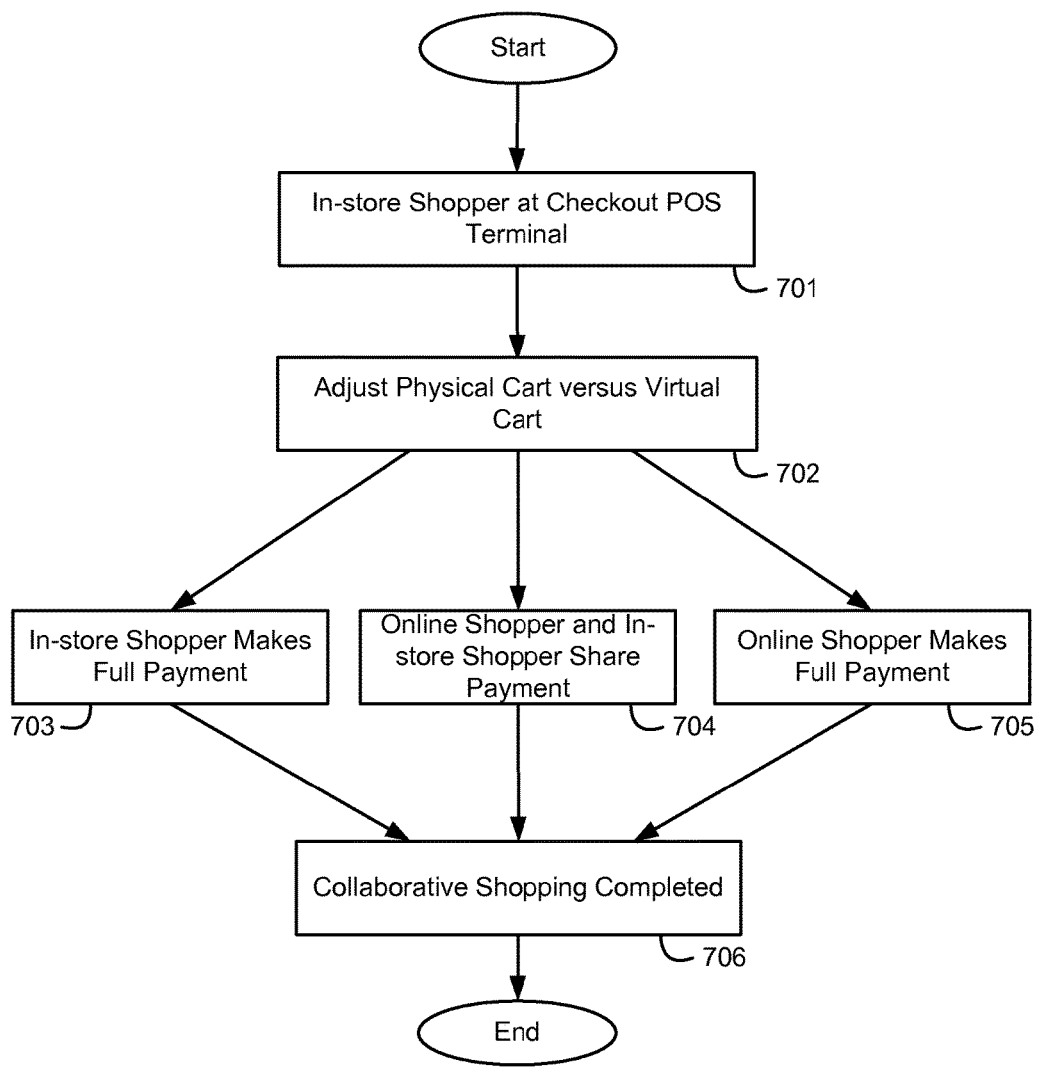
FIG. 7 is a flowchart illustrating an exemplary process in which shoppers may collaborate on paying for the purchased items, according to an embodiment of the invention.

FIG. 7 is a flowchart illustrating an exemplary process in which shoppers may jointly select payment options for the purchased items, according to an embodiment of the invention. The in-store shopper 420 in a collaborative shopping session may proceed to a checkout terminal to pay for the items, at step 701. A PSA device 328 attached to the physical shopping cart of the in-store shopper 420 may compare the contents of the physical shopping cart against the contents of a virtual shopping cart maintained by the PSA device 328 and make adjustments as needed, at step 702. The in-store shopper 420 may pay for all purchase items in step 703 or partially pay for some items while the remaining items are paid by an online shopper 430 who participates in the collaborative shopping session, in step 704. Alternatively, the online shopper 430 may pay for all purchased items, at step 705. The collaborative shopping session is completed at step 706.

Figure 8:
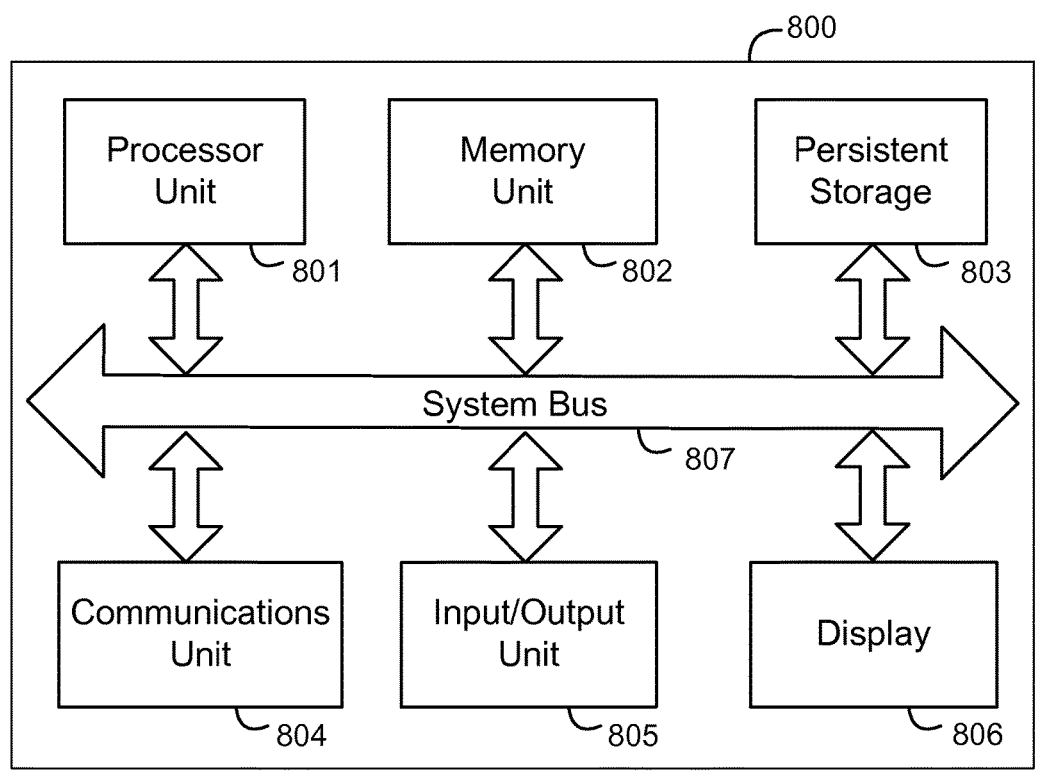
FIG. 8 is a block diagram of functional components in a computer system in which aspects of the invention may be implemented, according to an embodiment of the invention.

FIG. 8 is a block diagram of functional components in a computer system in which aspects of the invention may be implemented, according to an exemplary embodiment of the invention. Computer 800 includes a processor 801, a memory 802, a persistent storage 803, a communications unit 804, an input/output unit 805, a display 806, and system bus 807. As an example, processor unit 801 may include one or more processing cores and computer memory 802 may comprise EEPROM memory modules. Communications unit 804 may include network interface adapters, modems and support software. Input/output unit 805 may include a keyboard, mouse, and printer. Persistent storage 803 may comprise a hard disk drive or an optical disk drive.

Computer programs are typically stored in persistent storage 803 until they are needed for execution, at which time the programs are brought into memory unit 802 so that they can be directly accessed by processor unit 801. Processor 801 selects a part of memory 802 to read or write based on an address in memory 802 provided along with a read or write request. Usually, the reading and interpretation of an encoded instruction at an address causes processor 801 to fetch a subsequent instruction, either at a subsequent address or some other address.

An operating system runs on processor unit 801 to coordinate and control various components within computer 800 and to perform system tasks required by applications running on the computer 800. The operating system may be a commercially available or open source operating system, as are well known in the art.

Instructions for the operating system and applications or programs may be stored are located on storage devices, such as a hard disk drive 803. These instructions and may be loaded into main memory 802 for execution by processor 801. The processes of the illustrative embodiments may be performed by processor 801 using computer implemented instructions, which may be located in memory 802. Some of the processes may read from or write data to a data storage device such as hard disk drive 803.

The system components shown in FIG. 8 can be varied from the illustrative examples shown. In some illustrative examples, computer system 800 may be a personal digital assistant (PDA) configured with flash memory to provide a non-volatile memory for storing operating system files and/or user-generated data. Additionally, computer system 800 can be a tablet computer, laptop computer, or a computer-embedded communication device.

The subject matter described above is provided by way of illustration only and should not be construed as limiting. Various modifications and substitutions of the described components and operations can be made by those skilled in the art without departing from the spirit and scope of the present invention defined in the following claims, the scope of which is to be accorded the broadest interpretation so as to encompass such modifications and equivalent structures. As will be appreciated by those skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, a "memory stick", optical media, magneto-optical media, CD-ROM, etc.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electormagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing. Computer program code for carrying out operations for aspects of the present disclosure may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a wide area network (WAN), Ethernet, or the connection may be made to an external computer, for example, through the Internet using an Internet Service Provider.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures described above illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method, comprising:
   establishing, by a first computer hardware system, first and second virtual shopping carts respectively associated with first and second shopping devices that are networked together;
   establishing a joint virtual shopping cart using the first and second virtual shopping carts;
   updating, by the first computer hardware system, based upon a change in a content of one of the first and second virtual shopping carts, the joint virtual shopping cart; and
   updating, by the first computer hardware system, based upon the update to the joint virtual shopping cart, the first and second shopping devices, wherein
   the first shopping device is a second computer hardware system,
   the first virtual shopping cart is associated with an online shopping session using the second computer hardware system, and
   the second virtual shopping cart is associated with a physical shopping cart.

2. The method of claim 1, wherein
   the second shopping device is a personal shopping assistant.

3. The method of claim 2, wherein
   the personal shopping assistant is configured to identify contents of the physical shopping cart.

4. The method of claim 2, wherein
   the personal shopping assistant is configured to include first and second views,
   the first view indicates contents of the physical shopping cart, and
   the second view indicates contents of the joint virtual shopping cart.

5. The method of claim 1, wherein
   each of the first and second shopping devices are configured to store shopper preferences respectively associated with users of the first and second shopping devices.

6. The method of claim 5, wherein
   the shopper preferences include at least one of:
   shopping channel preference for purchasing a particular item,
   permission requirement for sharing shopping data, and
   shopping channel preference for price comparison.

7. The method of claim 5, wherein
   the first and second shopping devices are configured to collaborate to determine a manner by which items in the joint virtual shopping cart are purchased.

8. A collaborative shopping hardware system, comprising:
   a hardware processor configured to initiate the following executable operations:
   establishing first and second virtual shopping carts respectively associated with first and second shopping devices that are networked together;
   establishing a joint virtual shopping cart using the first and second virtual shopping carts;
   updating, based upon a change in a content of one of the first and second virtual shopping carts, the joint virtual shopping cart, and
   updating, based upon the update to the joint virtual shopping cart, the first and second shopping devices, wherein
   the first shopping device is a first computer hardware system,
   the first virtual shopping cart is associated with an online shopping session using the first computer hardware system, and
   the second virtual shopping cart is associated with a physical shopping cart.

9. The collaborative shopping hardware system of claim 8, wherein
   the second shopping device is a personal shopping assistant.

10. The collaborative shopping hardware system of claim 9, wherein
    the personal shopping assistant is configured to identify contents of the physical shopping cart.

11. The collaborative shopping hardware system of claim 9, wherein
    the personal shopping assistant is configured to include first and second views,
    the first view indicates contents of the physical shopping cart, and
    the second view indicates contents of the joint virtual shopping cart.

12. The collaborative shopping hardware system of claim 8, wherein
    each of the first and second shopping devices are configured to store shopper preferences respectively associated with users of the first and second shopping devices.

13. The collaborative shopping hardware system of claim 12, wherein
the shopper preferences include at least one of:
shopping channel preference for purchasing a particular item,
permission requirement for sharing shopping data, and
shopping channel preference for price comparison.

14. The collaborative shopping hardware system of claim 12, wherein
the first and second shopping devices are configured to collaborate to determine a manner by which items in the joint virtual shopping cart are purchased.

15. A computer program product, comprising:
a computer hardware storage device having stored therein computer readable program code,
the computer readable program code, which when executed by a collaborative shopping hardware system, causes the collaborative shopping hardware system to perform:
a hardware processor configured to initiate the following executable operations:
establishing first and second virtual shopping carts respectively associated with first and second shopping devices that are networked together;
establishing a joint virtual shopping cart using the first and second virtual shopping carts;
updating, based upon a change in a content of one of the first and second virtual shopping carts, the joint virtual shopping cart, and
updating, based upon the update to the joint virtual shopping cart, the first and second shopping devices, wherein
the first shopping device is a first computer hardware system,
the first virtual shopping cart is associated with an online shopping session using the first computer hardware system, and
the second virtual shopping cart is associated with a physical shopping cart.

16. The computer program product of claim 15, wherein
the second shopping device is a personal shopping assistant.

17. The computer program product of claim 16, wherein
the personal shopping assistant is configured to identify contents of the physical shopping cart.

18. The computer program product of claim 16, wherein
the personal shopping assistant is configured to include first and second views,
the first view indicates contents of the physical shopping cart, and
the second view indicates contents of the joint virtual shopping cart.

19. The computer program product of claim 15, wherein
each of the first and second shopping devices are configured to store shopper preferences respectively associated with users of the first and second shopping devices.

20. The computer program product of claim 19, wherein
the shopper preferences include at least one of:
shopping channel preference for purchasing a particular item,
permission requirement for sharing shopping data, and
shopping channel preference for price comparison.

* * * * *